United States Patent Office 3,154,558
Patented Oct. 27, 1964

3,154,558
N,1-(8-AMINOMENTHYL) THIAZOLE-
SULFENAMIDES
John J. D'Amico, Charleston, W. Va., assignor to
Monsanto Company, a corporation of Delaware
No Drawing. Filed May 16, 1962, Ser. No. 195,334
9 Claims. (Cl. 260—302)

The present invention relates to derivatives of p-methyl isopropyl cyclohexane, more generally known or identified as p-menthane, and specifically relates to thiazole-sulfenamide derivatives thereof. Such products, as are shown by the examples that follow, are readily produced by the controlled oxidation of a mixture of a diamino menthane and a thiazole. The new chemical products possess the property and function of accelerating the vulcanization of rubber and of producing a rubber vulcanizate of satisfactory commercial quality while delaying the scorch tendency of tire tread stocks containing the newer types of carbon black. The invention will be apparent and understood from the examples that follow.

EXAMPLE 1

A solution was prepared comprising 29.2 parts (0.169 mole) of 2-mercaptobenzothiazole of 97% purity, in 340 parts of water containing 54.2 parts (0.338 mole) of 25% caustic soda solution and 144 parts (0.845 mole) of 1,8-diaminomenthane. This solution was continuously and vigorously agitated while slowly adding over a period of about 90 minutes a solution containing 43.3 parts of iodine dissolved in 575 parts of water containing 46.7 parts of potassium iodide. During the addition of the oxidizing agent the temperature of the mixture was held between 25-30° C. After the mixture was completed, agitation was continued for about another hour, whereupon the mixture was cooled to about 10° C. and the solid product removed by filtration means. The product was washed with water until the wash waters were neutral to litmus and the yellow colored solid product was air dried at room temperature. The N,1-(8-aminomenthyl)-2-benzothiazole sulfenamide so obtained melted at 79-80° C. and analyzed 19.05% sulfur as compared to 19.11% calculated for $C_{17}H_{25}N_3S_2$. The product has the following structural formula:

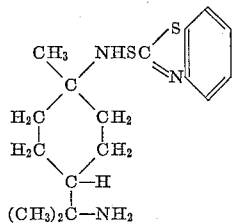

EXAMPLE 2

As another example of the invention, N,1-(8-aminomenthyl)-5-chloro-2-benzothiazolesulfenamide was prepared, which product has the following structural formula:

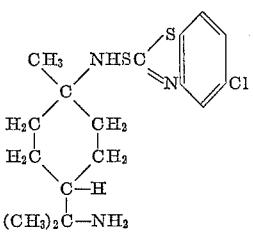

Following the procedure described in detail in Example 1, a solution of 43.3 parts of iodine dissolved in 575 parts of water containing 46.7 parts of potassium iodide was slowly added as before to a solution formed by dissolving 33.2 parts (0.17 mole) of 5-chloro-2-mercapto-benzothiazole in 340 parts of water containing 54.4 parts (0.34 mole) of 25% caustic soda and 170.3 parts (1.0 mole) of 1,8-diaminomenthane. The cream colored solid melted at 65-67° C. and on analysis was found to contain 17.36% sulfur and 9.54% chlorine as compared to 17.33% sulfur and 9.58% chlorine calculated for $C_{17}H_{24}ClN_3S_2$.

EXAMPLE 3

Again following the procedure described in detail in Example 1, a solution of 32.2 parts (0.17 mole) of methyl-2-mercapto-4-methyl-5-thiazolecarboxylate in 100 parts of water containing 54.4 parts (0.34 mole) of 25% caustic soda solution and 170.3 parts (1.0 mole) of 1,8-diaminomenthane was treated with a solution of 43.3 parts iodine dissolved in 575 parts of water containing 46.7 parts of potassium iodide. The resulting N,1-(8-aminomenthyl - 5 - carbomethoxy-4-methyl-2-thiazolesul-fenamide, a tan colored solid, melted at 60-62° C. Analysis gave 17.23% sulfur as compared to 17.93% calculated for $C_{16}H_{27}N_3O_2S_2$. The product has the following structural formula:

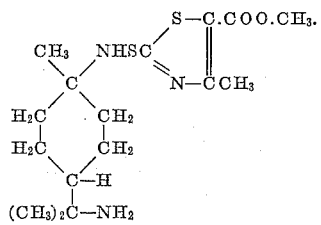

The products hereinbefore shown which are typical examples of the present invention were tested to determine their effectiveness as rubber vulcanization accelerators in the following tire tread stock:

| Stock | A | B | C |
|---|---|---|---|
| | Parts by weight | | |
| Smoked sheets rubber | 100 | 100 | 100 |
| Carbon black | 50 | 50 | 50 |
| Zinc oxide | 5 | 5 | 5 |
| Stearic acid | 2 | 2 | 2 |
| Saturated hydrocarbon softener | 3 | 3 | 3 |
| Sulfur | 2.5 | 2.5 | 2.5 |
| N,1-(8-Aminomenthyl)-2-benzothiazole-sulfenamide | 0.8 | | |
| N,1-(8-Aminomenthyl)-5-chloro-2-benzothiazole-sulfenamide | | 0.8 | 0.5 |
| N,N'-Dinitroso-N-diphenyl-p-phenylenediamine | | | 1.5 |

The stocks were cured in the usual manner by heating in a press for various periods of time at 144° C. The physical properties of the vulcanizates are set forth below:

Table I

| Stock | Cure Time in Mins. | Modulus of Elasticity in lbs./in.² at Elongation of 300% | Tensile at Break in lbs./in.² | Ultimate Elongation, percent |
|---|---|---|---|---|
| A | 30 | 2,296 | 3,463 | 416 |
| B | 30 | 2,410 | 3,743 | 440 |
| C | 30 | 2,050 | 3,840 | |
| A | 60 | 2,250 | 3,540 | 420 |
| B | 60 | 2,390 | 3,450 | 410 |
| C | 60 | 2,070 | 3,600 | |
| A | 90 | 2,310 | 3,273 | 400 |
| B | 90 | 2,063 | 3,343 | 436 |
| C | 90 | | | |

The resistance of the stocks to prevulcanization (scorch) was evaluated by means of a Mooney plastometer. The time required for incipient vulcanization or scorch was taken at the point on the plasticity curve when the plasticity began to rise continuously and reached an arbitrary value of 10 unit points above the minimum value.

*Table II*

| Stock: | Mooney scorch in mins. at 121° C. |
|---|---|
| A | 17 |
| B | 20 |
| C | 47 |

It will be appreciated that the thiazole radical can be varied quite widely. In general, suitable thiazole radicals are illustrated by 4-lower carboalkoxythiazolyl, 4-lower alkyl 5-lower carboalkoxythiazolyl, 4-lower alkylthiazolyl, 4,5-di(lower alkyl)thiazolyl, benzothiazolyl and 5-chlorobenzothiazolyl. These are illustrative only and others will be apparent to those skilled in the art to which the invention pertains. Thus, benzothiazolyl and 5-chlorobenzothiazolyl indicate the class of arylenethiazolyl which include lower alkyl substituted benzothiazolyl, lower alkoxy substituted benzothiazolyl and phenylbenzothiazolyl. Reaction of the corresponding mercaptothiazole in the manner described yields products valuable as accelerators and for other uses. The remaining amino group may be acylated or condensed with salt forming reagents further to modify the properties. Examples of the invention comprise thiazolesulfenamides of 1,8-diaminomenthane wherein the thiazole radical is 4-carboethoxythiazolyl, 5-carbobutoxy-5-methylthiazolyl, 5-carboethoxy-4-methylthiazolyl, 5 - carbomethoxy-4-methylthiazolyl, 4-methylthiazolyl, 4,5-dimethylthiazolyl, 4-ethyl-5-methylthiazolyl, 4-ethylthiazolyl, 4 - methyl-5-ethylthiazolyl, 4,5-diethylthiazolyl, 4-propylthiazolyl, 4-butylthiazolyl, benzothiazolyl, 4-ethylbenzothiazolyl, 7-methylbenzothiazolyl, 4-methylbenzothiazolyl, 5 - methylbenzothiazolyl, 6-methylbenzothiazolyl, 4-methyl-5-chlorobenzothiazolyl, 4-chlorobenzothiazolyl, 5 - chlorobenzothiazolyl, 6-chlorobenzothiazolyl, 6 - phenylbenzothiazolyl, 4-phenylbenzothiazolyl, 4,5 - dimethylbenzothiazolyl, 4,6-dimethylbenzothiazolyl, 4 - methoxybenzothiazolyl, 5-methoxybenzothiazolyl, 6-methoxybenzothiazolyl, 4 - methoxy - 6 - chlorobenzothiazolyl, 4-ethoxybenzothiazolyl, 5-ethoxybenzothiazolyl, 4,6-dimethyl-7-chlorobenzothiazolyl or 4,6-dimethyl-5,7-dichlorobenzothiazolyl. However, these are not necessarily equivalent and benzothiazolyl and 5-chlorobenzothiazolyl are preferred. The 4-lower alkyl 5-lower carboalkoxythiazolyl radicals are advantageous in that from them it has been possible to prepare solid products as was obtained from arylenethiazoles. This simplifies purification and recovery.

EXAMPLE 4

As a further specific embodiment of the invention, a solution was prepared comprising 32.8 parts (0.25 mole) of 4-methyl-2-mercaptothiazole in 25 parts of water containing 40 parts (0.25 mole) of 25% caustic soda solution. This solution was agitated while adding dropwise 214 parts (1.25 mole) of 1,8-diaminomenthane. After the addition was completed, agitation was continued for 15 minutes and then 49.5 parts of 25% sulfuric acid was added dropwise over the next 15 minutes. After stirring for 15 minutes, 22.43 parts of sodium hypochlorite was added in the form of a solution containing 14.02 g./100 ml. The solution was added dropwise over a period of 1½ hours. During the addition of the hypochlorite and for approximately a period of an hour thereafter, the temperature of the mix was maintained between 45–50° C. After this there was added to the stirred mixture 1500 parts of water and about 4 parts of sodium sulfite to destroy any excess of hypochlorite present. After cooling to 5° C. and stirring at 0–5° C. for 30 minutes, the aqueous layer was decanted and the oily residue dissolved in 500 ml. of ethyl ether. The ether solution was washed with water until neutral to litmus and dried over sodium sulfate. The ether was removed in vacuo at a maximum temperature of 40° C./1–2 mm. N,1 - (8-aminomenthyl)-4-methyl-2-thiazolesulfenamide was obtained as a viscous amber liquid in 62.9% yield. Analysis gave 21.72% sulfur compared to 21.41% calculated for $C_{14}H_{25}N_3S_2$. The compound was incorporated in a typical tread stock comprising:

| | Parts by weight |
|---|---|
| Smoked sheet rubber | 100 |
| Carbon black | 50 |
| Zinc oxide | 5 |
| Stearic acid | 3 |
| Saturated hydrocarbon softener | 3 |
| Sulfur | 2.5 |
| N,1 - (8 - Aminomenthyl)-4-methyl-2-thiazolesulfenamide | 0.5 |

The stock was cured in the usual manner by heating in a press for 45 minutes at 144° C. The physical properties of the vulcanizate and resistance of the unvulcanized composition to scorch are set forth below:

*Table III*

| Cure Time in Mins. | Modulus of Elasticity in lbs./in.$^2$ at Elongation of 300% | Tensile at Break in lbs./in.$^2$ | Ult. Elong., percent | Scorch Time in Minutes at 135° C. |
|---|---|---|---|---|
| 45 | 2,030 | 3,840 | 540 | 11.3 |

Additionally, the product of Example 4 was tested in a typical tread stock containing a retarder of vulcanization. As the formulation there was employed a mix comprising 100 parts of smoked sheet rubber, 50 parts of carbon black, 5 parts of zinc oxide, 3 parts of stearic acid, 3 parts of saturated hydrocarbon softener, 2.5 parts of sulfur, 0.5 part of N,1-(8-aminomenthyl)-4-methyl-2-thiazolesulfenamide and 1.0 part of N-nitrosodiphenylamine, a retarder particularly effective with sulfenamide accelerators. The stock was cured for 45 minutes in a press at 144° C. The test results obtained were as follows:

*Table IV*

| | |
|---|---|
| Modulus of elasticity in lbs./in.$^2$ at 300% elongation | 1750 |
| Tensile at break in lbs./in.$^2$ | 3800 |
| Ultimate elongation, percent | 550 |
| Mooney scorch at 135° C.—minutes | 16.2 |

EXAMPLE 5

Proceeding in the manner as described in Example 4 except that 50.8 parts (0.25 mole) of ethyl 2-mercapto-4-methyl-5-thiazolecarboxylate were used in place of the thiazole there employed, and maintaining the reaction temperature between 30–40° C. during the addition of the sodium hypochlorite solution, there was obtained N,1-(8-aminomenthyl)-5- carboethoxy-4-methyl-2-thiazolesulfenamide as a viscous oil. The product was incorporated in a typical rubber stock comprising 100 parts of smoked sheet rubber, 50 parts of carbon black, 5 parts of zinc oxide, 3 parts of stearic acid, 3 parts of saturated hydrocarbon softener, 2.5 parts of sulfur, 1.0 part of antioxidant and 0.5 part of N,1-(8-aminomenthyl)-5-carboethoxy-4-methyl-2-thiazolesulfenamide. The stock was cured at 144° C. The test results at optimum or 45 minute cure were as follows:

*Table V*

| | |
|---|---|
| Modulus of elasticity in lbs./in.$^2$ at 300% elongation | 1910 |
| Tensile at break in lbs./in.$^2$ | 3750 |
| Ultimate elongation, percent | 550 |
| Mooney Scorch at 135° C.—minutes | 11.2 |

It is evident that the thiazolesulfenamides of 1,8-diaminomenthane exhibit excellent rubber vulcanizing properties and also possess outstanding anti-scorch properties which property is augmented by the presence of a nitroso secondary amine.

It is intended to cover all changes and modifications of the examples of the invention herein chosen for purposes of disclosure which do not constitute departures from the spirit and scope of the invention.

This application is a continuation-in-part of applications Serial No. 555,300, filed December 27, 1955, now U.S. 2,971,038 granted February 7, 1961 and Serial No. 55,162, filed September 12, 1960 now abandoned.

What is claimed is:

1. N,1 - (8-aminomenthyl) - 4 - lower alkyl-2-thiazolesulfenamide.
2. N,1-(-8-aminomenthyl)-4-lower alkyl-5-lower carboalkoxy-2-thiazolesulfenamide.
3. N,1 - (8-aminomenthyl)-4-lower carboalkoxy-2-thiazolesulfenamide.
4. N,1 - (8-aminomenthyl)-4,5-di(lower alkyl)-2-thiazolesulfenamide.
5. N,1 - (8 - aminomenthyl)-5-chloro-2-benzothiazolesulfenamide.
6. N,1 - (8 - aminomenthyl - 2 - benzothiazolesulfenamide.
7. N,1 - (8-aminomenthyl)-5-carbomethoxy-4-methyl-2-thiazolesulfenamide.
8. N,1 - (8-aminomenthyl)-4-methyl-2-thiazolesulfenamide.
9. N,1 - (8-aminomenthyl)-5-carboethoxy-4-methyl-2-thiazolesulfenamide.

References Cited in the file of this patent

D'Amico et al.: J. Am. Chem. Soc., vol. 79, pages 5270–6 (1957).